US011687604B2

(12) United States Patent
Eggleston, IV et al.

(10) Patent No.: US 11,687,604 B2
(45) Date of Patent: Jun. 27, 2023

(54) METHODS AND SYSTEMS FOR SELF-TUNING PERSONALIZATION ENGINES IN NEAR REAL-TIME

(71) Applicant: YE Ventures, LLC, Baltimore, MD (US)

(72) Inventors: York Eggleston, IV, Baltimore, MD (US); Llewellyn Wall, Alexandria, VA (US)

( * ) Notice: Subject to any disclaimer, the term of this patent is extended or adjusted under 35 U.S.C. 154(b) by 0 days.

(21) Appl. No.: 16/538,484

(22) Filed: Aug. 12, 2019

(65) Prior Publication Data

US 2021/0390150 A1    Dec. 16, 2021

Related U.S. Application Data

(63) Continuation of application No. 16/513,668, filed on Jul. 16, 2019, now abandoned.

(60) Provisional application No. 62/698,719, filed on Jul. 16, 2018.

(51) Int. Cl.
| | | |
|---|---|---|
| *G06F 16/9535* | (2019.01) | |
| *G06F 3/04847* | (2022.01) | |
| *G06F 16/248* | (2019.01) | |
| *G06F 40/134* | (2020.01) | |
| *G06F 16/951* | (2019.01) | |
| *G06F 16/906* | (2019.01) | |
| *G06F 16/901* | (2019.01) | |
| *G06F 16/957* | (2019.01) | |
| *G06F 40/197* | (2020.01) | |

(52) U.S. Cl.
CPC ...... *G06F 16/9535* (2019.01); *G06F 3/04847* (2013.01); *G06F 16/248* (2019.01); *G06F 16/906* (2019.01); *G06F 16/9024* (2019.01); *G06F 16/951* (2019.01); *G06F 16/9577* (2019.01); *G06F 40/134* (2020.01); *G06F 40/197* (2020.01)

(58) Field of Classification Search
CPC .... G06Q 50/01; G06F 16/248; G06F 16/9024
See application file for complete search history.

(56) References Cited

U.S. PATENT DOCUMENTS

| | | | |
|---|---|---|---|
| 8,180,804 B1 * | 5/2012 | Narayanan | ........ G06F 16/24575 707/798 |
| 8,185,558 B1 * | 5/2012 | Narayanan | .......... G06F 3/04842 707/798 |

(Continued)

*Primary Examiner* — Benjamin Smith
(74) *Attorney, Agent, or Firm* — Wood IP LLC

(57) ABSTRACT

Provided are systems and methods for personalizing website content configured for delivery to a user. An exemplary system includes a graph database for storage of data (i) representative of the user's interaction with existing content presented on the website and (ii) indicative of content entities of interest to the user, the data being stored as nodes. Also included are one or more personalization engines configured to analyze relations between one or more pairs of the nodes, each analyzed relation creating a respective link, and a structure of each of the links being a function of the user's interaction with the existing content. The one or more processors are configured to personalize new content for presentation to the user and a portion of the new content is (i) derived from one of the respective links and (ii) delivered to the user in near-real time when a type of the first link is within a first category.

16 Claims, 11 Drawing Sheets

(56) References Cited

U.S. PATENT DOCUMENTS

| | | | |
|---|---|---|---|
| 8,442,973 B2* | 5/2013 | Cramer | G06F 16/248 707/753 |
| 8,572,129 B1* | 10/2013 | Lee | G06Q 50/01 707/798 |
| 8,769,434 B2* | 7/2014 | Hoffman | G06Q 30/0251 715/800 |
| 8,813,125 B2* | 8/2014 | Reisman | H04N 21/440263 725/110 |
| 9,098,872 B2* | 8/2015 | Vaynblat | G06F 16/248 |
| 9,223,879 B2* | 12/2015 | Narayanan | G06F 16/24575 |
| 9,223,899 B2* | 12/2015 | Singh | G06F 16/24575 |
| 9,430,531 B2* | 8/2016 | Vaynblat | G06F 16/2465 |
| 9,563,923 B2* | 2/2017 | Sachdev | G06Q 50/01 |
| 9,633,121 B2* | 4/2017 | Boucher | G06F 16/90324 |
| 9,754,037 B2* | 9/2017 | Ayan | G06F 16/9535 |
| 9,779,385 B2* | 10/2017 | Rajaram | G06Q 10/10 |
| 9,836,765 B2* | 12/2017 | Hariri | G06Q 30/0631 |
| 9,936,043 B2* | 4/2018 | Hoffman | H04L 67/306 |
| 10,528,635 B2* | 1/2020 | Ayan | G06Q 50/01 |
| 10,580,024 B2* | 3/2020 | Dhawan | G06Q 30/0205 |
| 10,782,986 B2* | 9/2020 | Martin | H04L 41/22 |
| 2012/0042280 A1* | 2/2012 | Hoffman | H04L 67/306 715/800 |
| 2012/0331063 A1* | 12/2012 | Rajaram | G06Q 50/01 709/206 |
| 2013/0103628 A1 | 4/2013 | Skelton et al. | |
| 2013/0238778 A1* | 9/2013 | Reitan | H04L 41/00 709/223 |
| 2014/0317526 A1* | 10/2014 | Hoffman | G06Q 30/0251 715/745 |
| 2015/0032717 A1* | 1/2015 | Cramer | G06F 16/24575 707/709 |
| 2015/0046566 A1* | 2/2015 | Vaynblat | G06Q 30/0244 709/217 |
| 2015/0326681 A1* | 11/2015 | Vaynblat | G06F 16/285 709/224 |
| 2016/0036661 A1* | 2/2016 | Sachdev | G06Q 50/01 709/204 |
| 2016/0048601 A1* | 2/2016 | Narayanan | G06F 16/24578 707/722 |
| 2016/0063115 A1* | 3/2016 | Ayan | G06F 16/9535 707/722 |
| 2016/0092920 A1* | 3/2016 | Vaynblat | H04L 41/12 705/14.53 |
| 2016/0350428 A1* | 12/2016 | Cramer | G06F 16/24575 |
| 2016/0371723 A1* | 12/2016 | Vaynblat | H04L 41/12 |
| 2016/0379270 A1* | 12/2016 | Shah | G06Q 30/0269 705/14.66 |
| 2017/0169455 A1* | 6/2017 | Dhawan | G06Q 30/205 |
| 2017/0206276 A1* | 7/2017 | Gill | G06F 16/285 |
| 2017/0316105 A1* | 11/2017 | Ayan | G06F 16/9535 |
| 2018/0198847 A1* | 7/2018 | Lai | H04L 67/52 |
| 2019/0155915 A1* | 5/2019 | Huang | G06F 16/9532 |
| 2019/0155916 A1* | 5/2019 | Huang | G06F 16/9535 |
| 2019/0258390 A1* | 8/2019 | Daly | G06F 16/24578 |
| 2019/0325863 A1* | 10/2019 | Martin | G06F 40/274 |
| 2020/0410012 A1* | 12/2020 | Moon | G06N 5/022 |

* cited by examiner

Personalization Table 500

| P-Type \ Engine | Compute | Analytics | Analytics Cycle | User Explicit | User Implicit | Admin Manual |
|---|---|---|---|---|---|---|
| Instant | | | | X | X | |
| Intra-Session | X | X | X | | | X |
| Extra-Session | X | X | X | | X | X |

FIG. 5

METHODS AND SYSTEMS FOR SELF-TUNING PERSONALIZATION ENGINES IN NEAR REAL-TIME

CROSS-REFERENCE TO RELATED APPLICATIONS

This application is a continuation of U.S. application Ser. No. 16/513,668, filed Jul. 16, 2019, which claims the benefit of U.S. Provisional Application No. 62/698,719, filed Jul. 16, 2018, both of which are incorporated herein by reference in their entirety.

I. TECHNICAL FIELD

The present invention relates to filtering and classification of data. More specifically, the present invention relates to filtering and classifying data used as a component in artificial intelligence-based personalization systems.

II. BACKGROUND OF THE INVENTION

At the dawn of the internet age (early 1990s), one of the earliest problems was determining how to automate the process by which information was gathered, sorted and delivered to consumers (or businesses) in an efficient enough time to use. Information aggregation (first under scarce data conditions), particularly for news was one of the major needs for consumers, representing opportunities for inventors and entrepreneurs.

The solutions that emerged were Rich Site Summary (RSS) and other content syndication-based tools combined with search algorithms. These solutions enabled news portals such as Yahoo, MSNBC and CNN or new software and new media firms such as Google News, Flipboard, and Microsoft News (now Bing News). The news portal got larger and larger, requiring greater storage with information having been aggregated from many other sites, plus the news that was created and sourced by the news portals themselves. This massive amount of information required more time to find the information that one was interested in finding.

In addition to the news portal sites, individual and small group sites became more accessible due to their availability online and by using the new news search technology provided by sources such as Google. Over the last decade, this model continued with many perspectives and sentiments and sources democratized by the new search technology that frequently placed large portal content on the same results pages as niche and fringe sites.

Continuously adding to the total amount of information available had caused new problems to arise, most centered around information overload. Common search solutions are not adequate, largely because they assume the user knows what to explicitly search for, and because search technologies don't know the user and cannot learn.

Conventional solutions primarily include two approaches: recommendation engines and social referral models (i.e., friends and contacts refer content to each other). As currently implemented, these two solutions are largely responsible for fake news, spam, and other noise permeating media channels.

III. SUMMARY

Given the aforementioned deficiencies, a need exists for optimizing top-performing personalization engines. More particularly, what is needed are tools to customize the personalization engines to recommend more transparent results and for individual consumers to be able to provide fine grain tuning of the personalization engine. Additionally, systems are needed to provide such recommendations and fine tuning substantially in real-time (i.e., near real-time).

In certain circumstances, an embodiment of the present invention provides a computer system for personalizing website content configured for delivery to a user. An exemplary system includes a graph database for storage of data (i) representative of the user's interaction with existing content presented on the website and (ii) indicative of content entities of interest to the user, the data being stored as nodes. Also included are one or more personalization engines configured to analyze relations between one or more pairs of the nodes, each analyzed relation creating a respective link, and a structure of each of the links being a function of the user's interaction with the existing content. The one or more processors are configured to personalize new content for presentation to the user and a portion of the new content is (i) derived from one of the respective links and (ii) delivered to the user in near-real time when a type of the first link is within a first category.

A suitable online platform, such as a dynamic news website, is populated with relevant multimedia content of interest to a consumer or user. This content is correlated with weighted maps or histograms of related nodes or entities and the relations in between. These maps are used to create and adjust profiles associated with the user's content interaction activity. The resulting user related maps are stored in a database, such as a graph database, where existing entity weights are adjusted, and where new weighted entities are added based upon the user's continued interactions.

The nodes and entities are individually analyzed, including their associated data, for an estimate of relevant value of each word to a given consumer. The results are the individual's intent profile, which continues to evolve over time as additional information is added to it.

Concurrently, a database of documents is analyzed on a standalone basis: either via scraping websites for articles, RSS feeds or other text delivery internet methods. These documents are likewise parsed, and entities extracted in the creation of a profile of each document. The profiles for each document are then compared against the consumers profiles and are ranked based on similarity or using more advanced techniques such word distance.

Embodiments of the present invention then permit the data to be collected in the profile substantially in real-time. Further, the data can be presented and viewed and then edited with the ability to determine the intensity and the sentiment—from negative—to positive, with neutral in between. The updated data is saved into the profile, thereby impacting the relevancy of the ranking for the content to be recommended. In the embodiments, the profile is being constantly updated via passive information as the user searches and interacts with content and commerce. This inferred approach impacts the profile but the individual weightings are not as great as the results of user selectable fine tuning.

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 5 is a tabular illustration of example personalization types mapped with the personalization engines depicted in FIG. 4.

Figure 7:
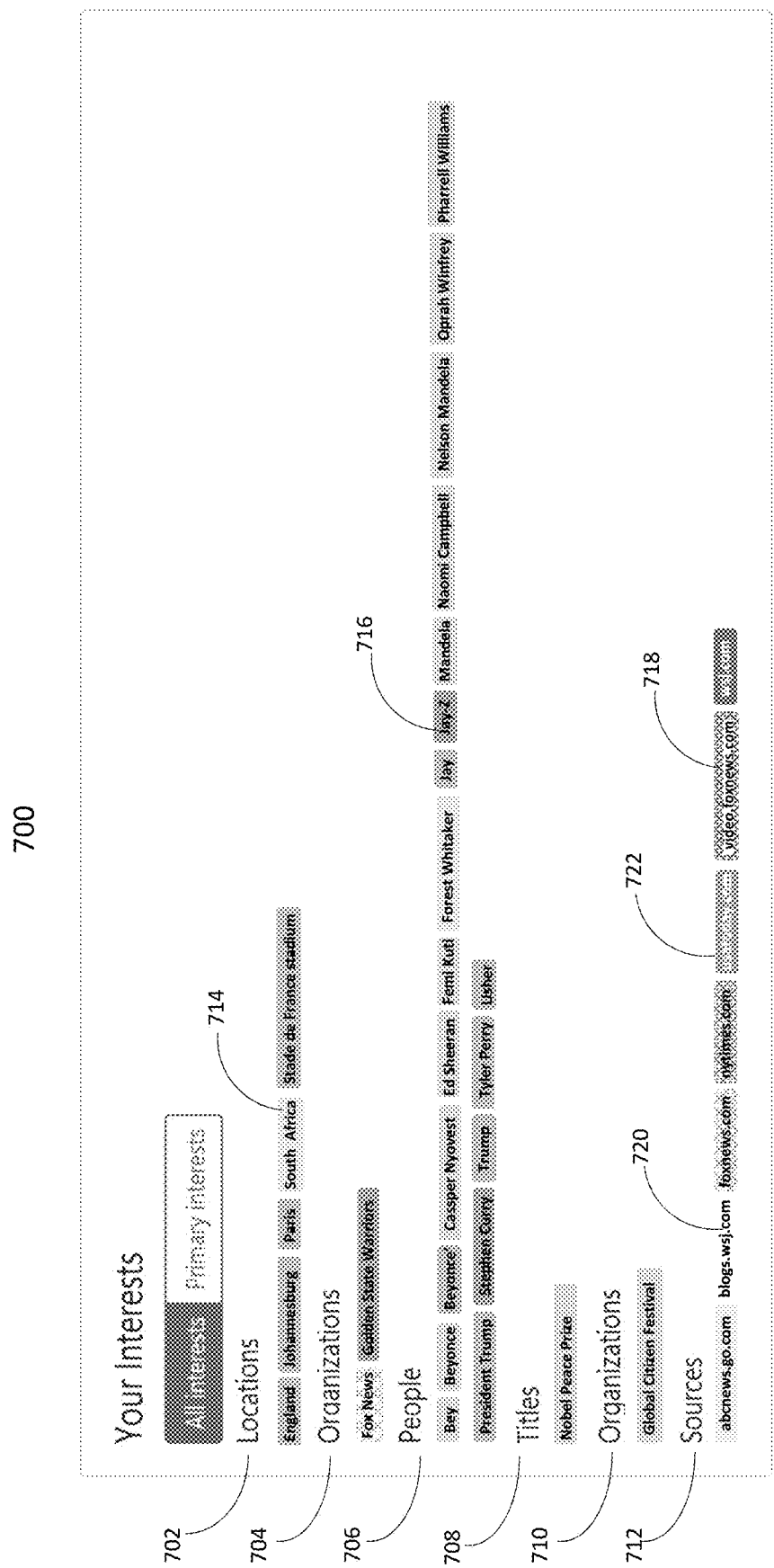
FIG. 7 illustrates an example summary of a user's personalization profile created in accordance with the embodiments.
Figure 8:
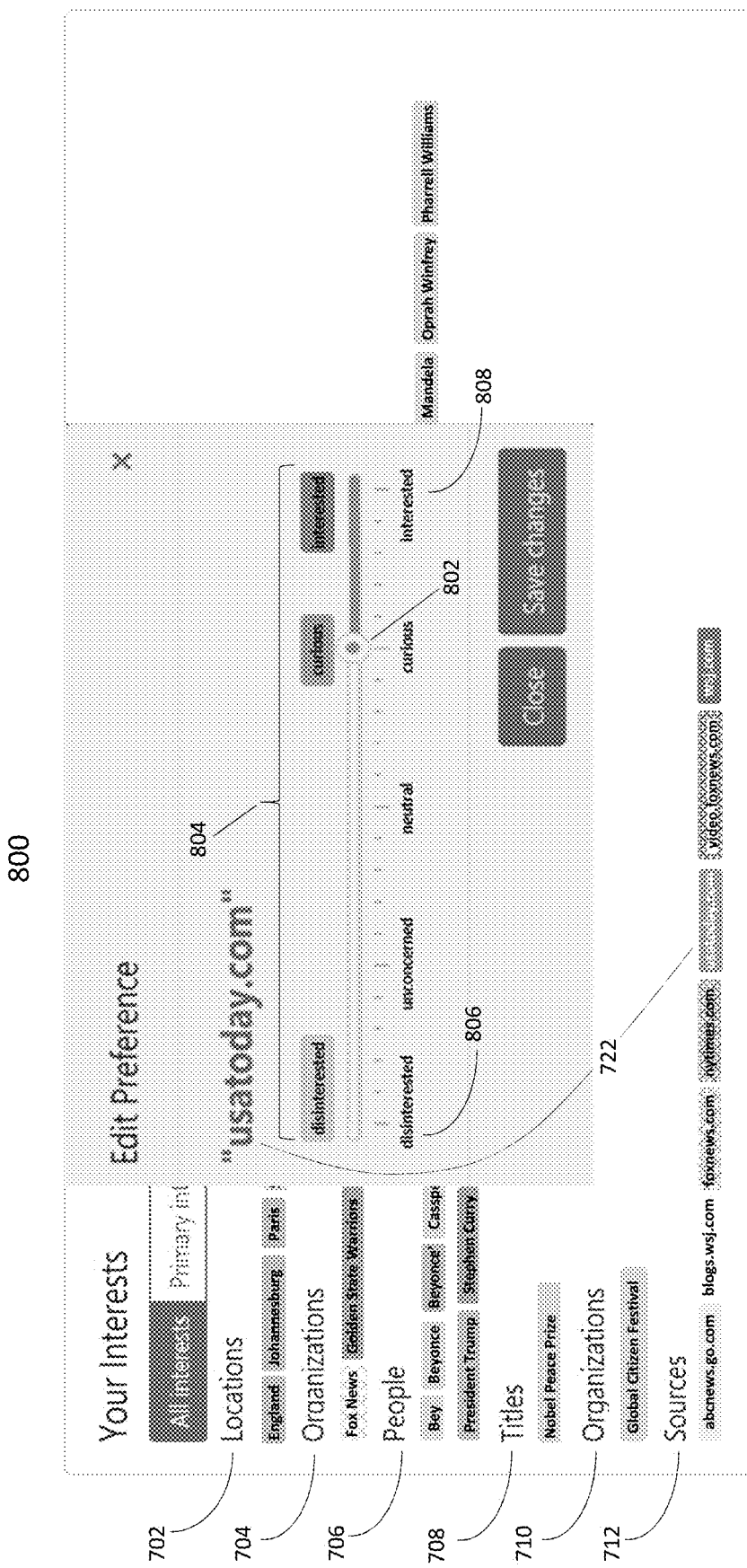

FIG. 8. illustrates a sample use case of an example slider interface tool permitting a user to fine tune the summary depicted in FIG. 7.

Figure 9:
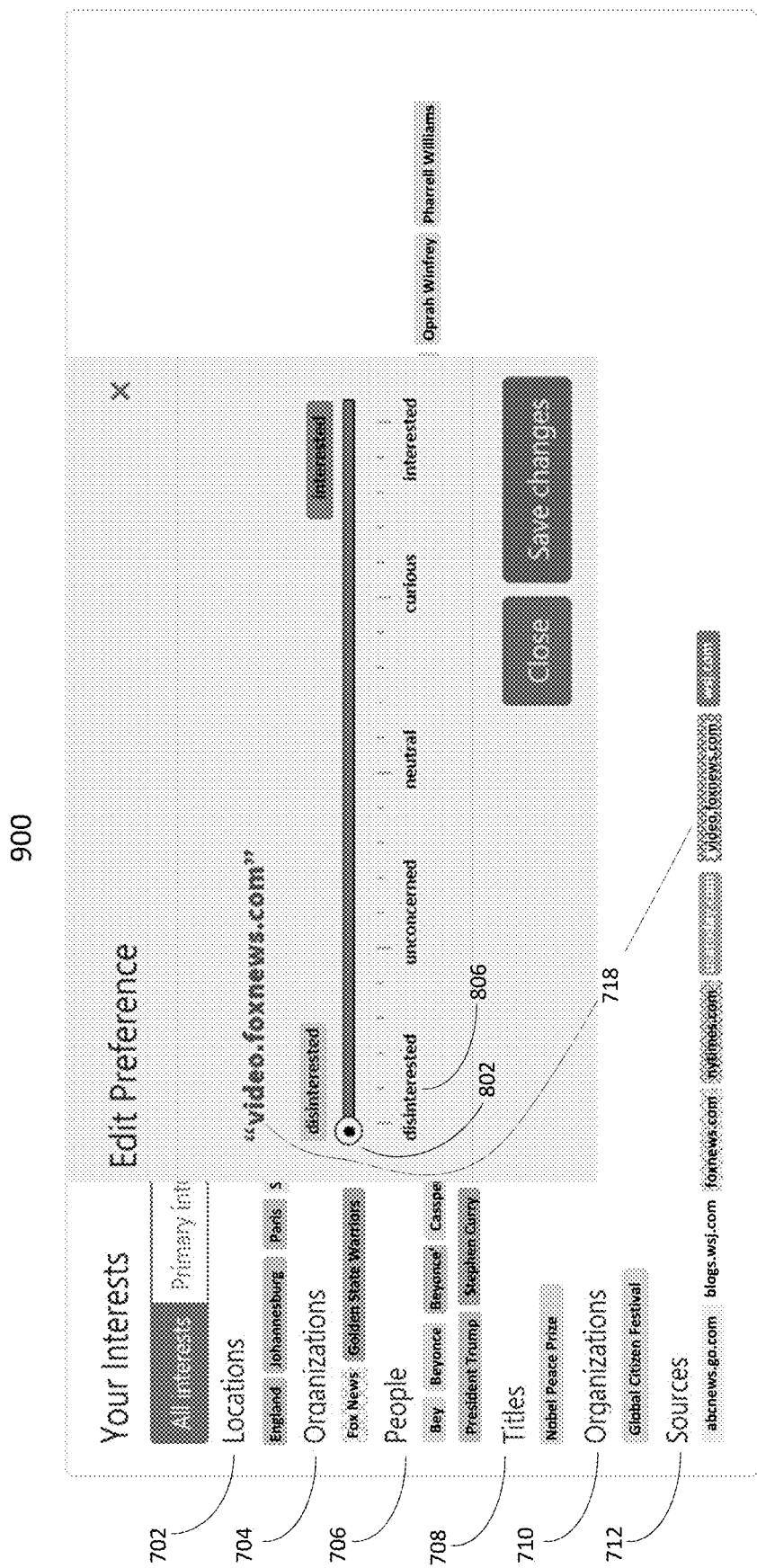

FIG. 9 illustrates another sample use case of the slider interface tool depicted in FIG. 8.

Figure 10:
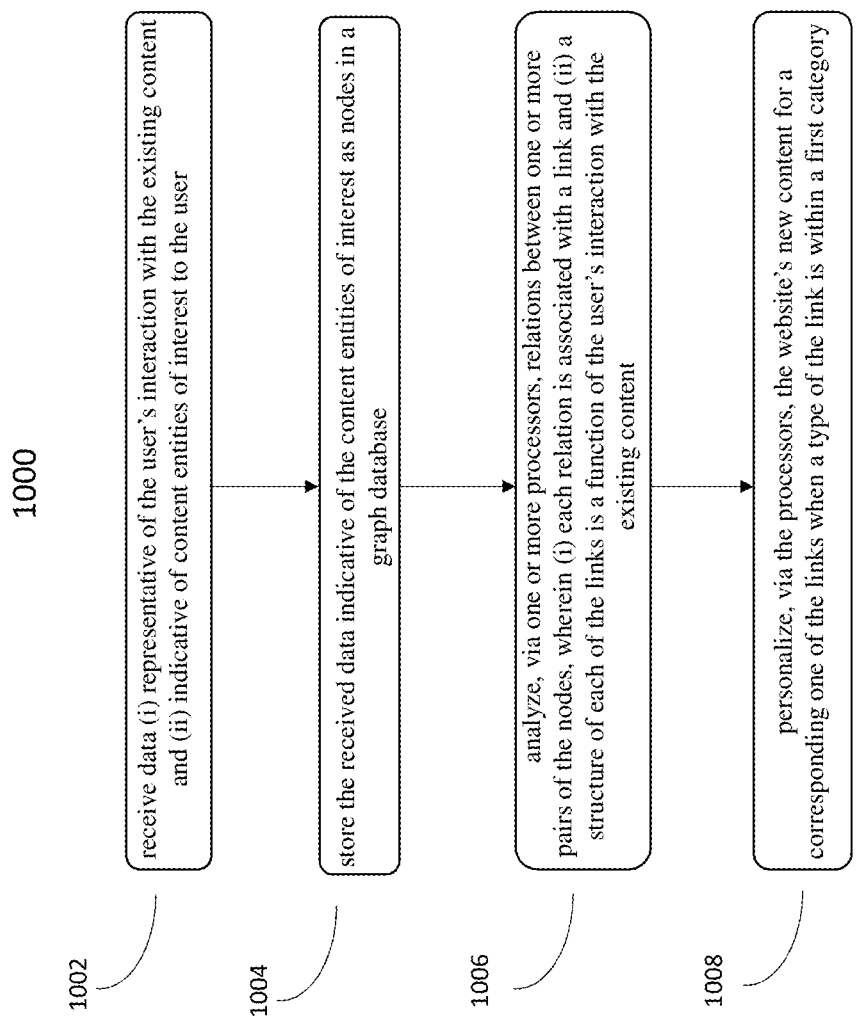

FIG. 10 is a flowchart an exemplary method of practicing an embodiment of the invention.

Figure 11:
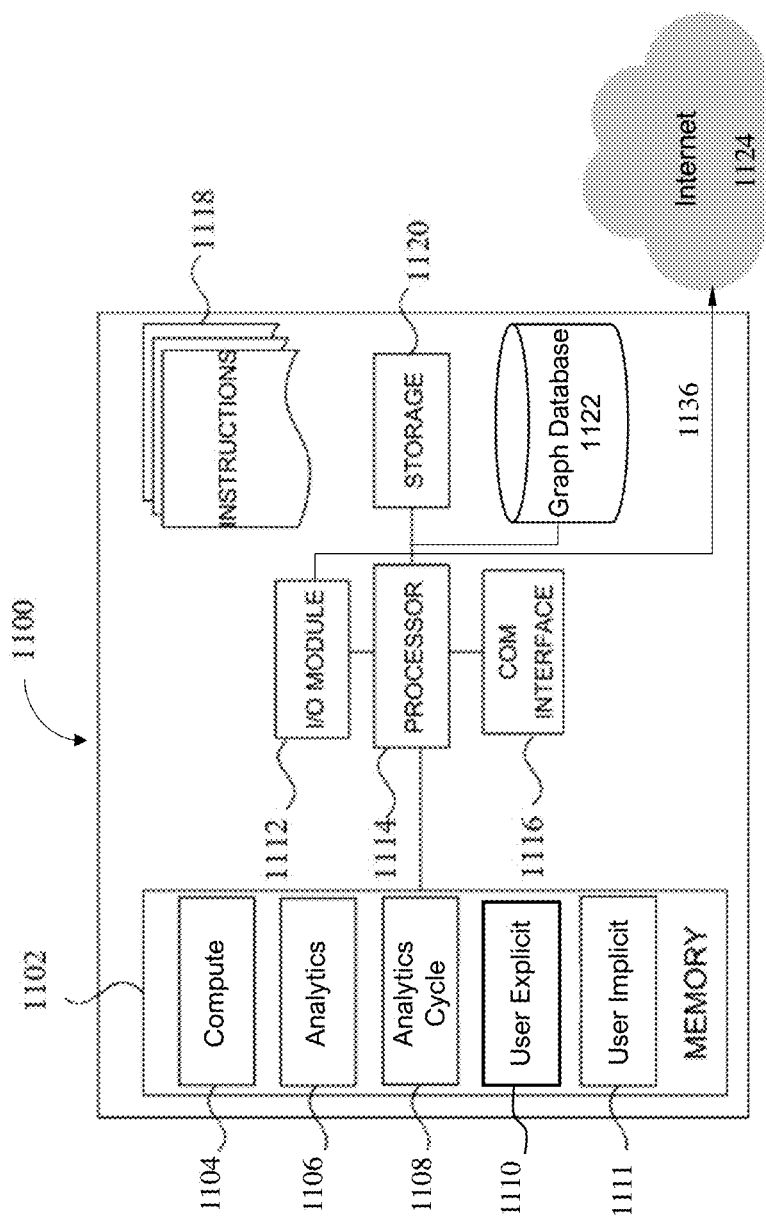

FIG. 11 illustrates one example of a non-generic computer system configured for implementing the embodiments.

V. DETAILED DESCRIPTION

Prior to discussing the drawings of the present disclosure at length, several terms and concepts are covered in order to facilitate the detailed description of the exemplary embodiments depicted in the drawings. It is noted that however that these terms and concepts do not limit the disclosure and that one of ordinary skill in the relevant art(s) will readily recognize modifications and changes applicable to the following ancillary systems and/or concepts that do not limit the scope of the present teachings.

The embodiments include (or assumes the presence of) a personalization or recommendation engine (the terms are used inter changeably throughout). The personalization engine uses artificial intelligence (machine learning) in the area of textual analysis to identify the media with which one interacts (scrolls, clicks or and includes other personal information). Once the media document that is interacted with is identified, a text parser is used to separate the words. The words are then fed into an entity extraction application—which identifies the major entities (mostly proper nouns) by comparing the parse text against a dictionary (database) of proper nouns/known entities.

In the embodiments, a consumer using the system will be able to directly customize the personalization system, altering the recommendation results via an interface for the manipulation of data that is being accumulated on the consumer, in near real-time. Additional embodiments provide customization of the personalization process by not only type or kind, but also by degree or intensity of like or interest. The results of the customization immediately impact the ranking of the content or commerce offering that is recommended to the user, in essence being real-time, or near real-time.

Additionally, embodiments of the present invention present a new way of transforming and displaying a personalization profile for the ease of data management and to provide an easier viewing and comparing format for mobile devices.

Figure 1:
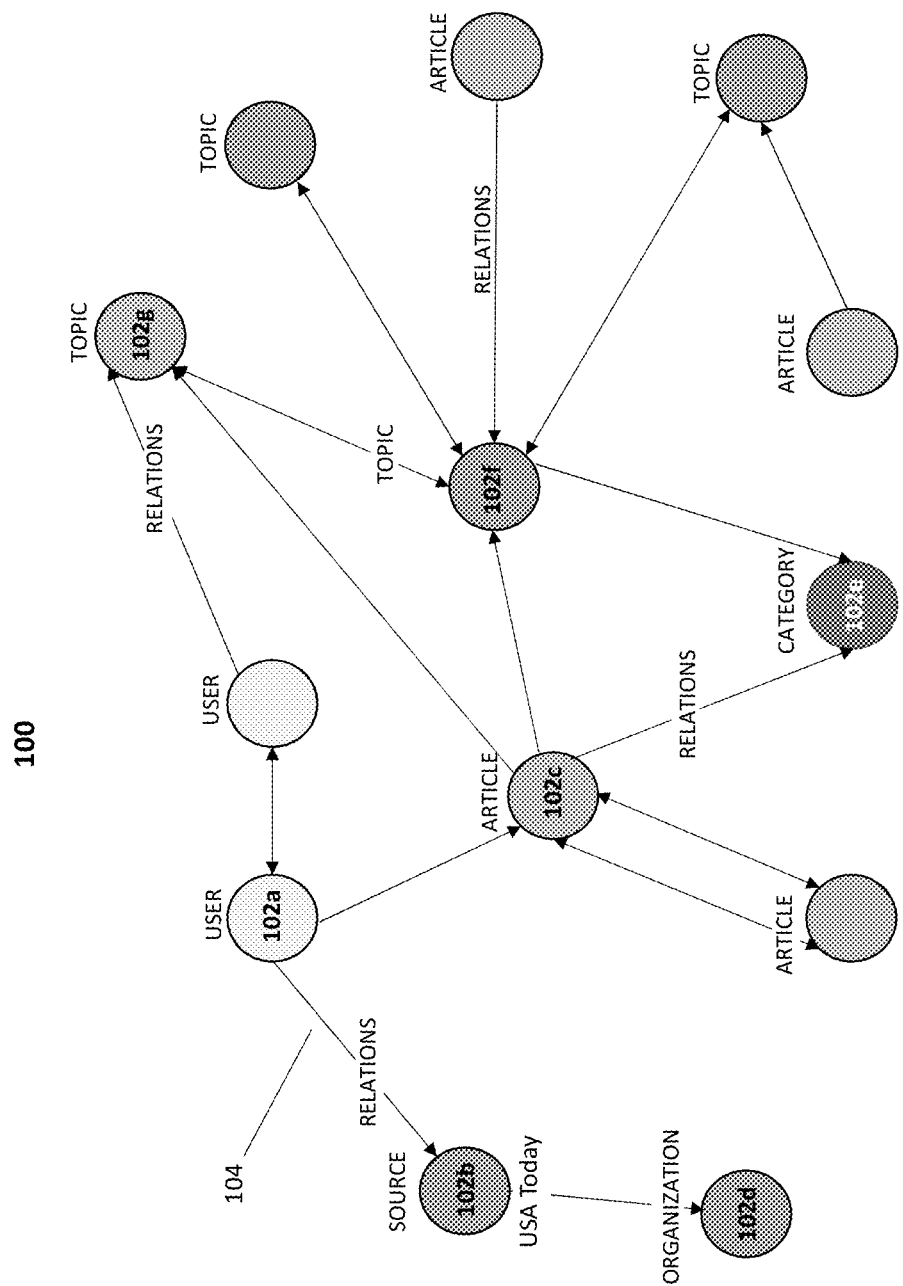
FIG. 1 illustrates an example graph database structured to form a content personalization model in accordance with embodiments of the present invention.

FIG. 1 illustrates an example graph database 100 structured to form a content personalization model in accordance with embodiments of the invention. In the embodiments described herein, the graph database 100 stores and maps structures (i.e., nodes and links) that define queries and relationships that are interconnected represent the user's content related interests.

The structures stored and mapped in the database 100 also define the type of information that can be stored in the graph database 100 and the corresponding functionality that can be extracted therefrom. This information and functionality are fundamental to creation of the personalization models described below. The graph database 100, and personalization models derived therefrom, provide several ultimate user implementation benefits. Among these many benefits are providing interactive website content personalization and customization. Dynamic news websites are merely one example of where these user benefits can be realized and appreciated.

In FIG. 1, each of the circles shown is a node representing key objects being tracked when performing personalization. By way of example only and not limitation, among the categories of nodes in the graph database 100 are user 102a, source 102b, article 102c, organization 102d, category 102e, topic 102f, etc. The lines (i.e., links) between the nodes (and their corresponding arrows) are relations that represent an understanding of how the nodes relate to each other. These links, such as link 104 between the user 102a and the source 102b, are developed and created in near real-time, as the user 102a interacts, as one example, with an interactive personalized news website.

In the illustrious embodiments, the links can be created based on the user's explicit actions, as well as the user's implicit behaviors. For example, to begin the personalization process, a sample personalized news website, referred to herein as "slim-spider" (not shown) may ask the user one or more questions, such as "do you like this particular news source," "do you believe this article was useful?" The user's responses to these, or similar questions, represents the user's explicit actions. Slim-spider's personalization engines also monitor the user's implicit behaviors, such as specific links the user clicks on to read the article and/or the particular source of the link and article. User explicit actions and implicit behaviors are discussed in greater detail below.

For example, the website's personalization engine may observe the user routinely chooses a particular source, such as USA Today, which for filtering purposes, the user will not be asked "do you like this?" Alternatively, the personalization engine may observe that the user never clicks on USA Today, or they tend to filter USA Today. These, or similar actions, represent the user's implicit behaviors. These are the types of explicit actions and implicit behaviors that create the links between users, between topics, between articles, or between various iterations thereof. Consider the following detailed example shown in FIG. 2.

Figure 2:
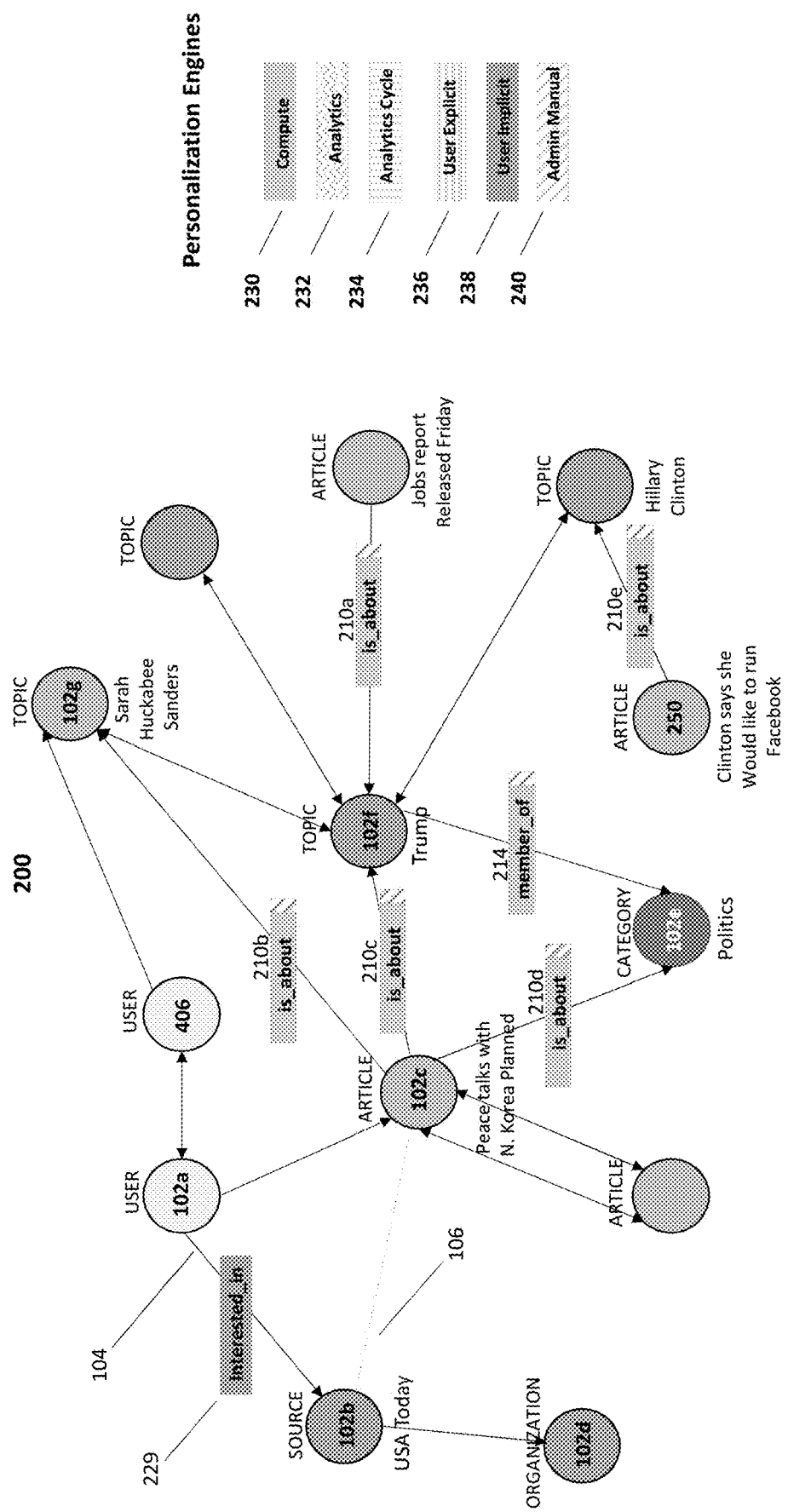
FIG. 2 illustrates a more detailed view of the personalization model graph database illustrated in FIG. 1.

FIG. 2 illustrates a more detailed view 200 of the graph database 100 illustrated in FIG. 1. In the example depicted in FIG. 2, the user 102a logs into the sample Slim-Spider website and clicks on the article 102c related in part to President Donald Trump. More specifically, for purposes of illustration, the title of the article 102c is "Peace Talks with North Korea Planned," and the source 102b of the article is "USA Today." When the user 102a clicks on a hyperlink on the Slim-Spider website for the article 102b, several things happen.

Once the user 102a clicks the hyperlink, the personalization engines (discussed in detail below) initially create a fairly weak link (i.e., the relation 104) between the user 102a and the USA Today source 102b. The link 104 between the user 102a and the source 102b is captured in the database 100 by a numerical value, or floating-point number, between zero (0) and one (1). In the present example, assume a small numerical value such as 0.0001 (not shown) is assigned to represent a strength or weighting of the relation 104. Additionally, the length of lines between a category and a topic may also be indicative of the level of interest or strength. For example, the relatively long line between the category 102e (politics) and the topic 102f (Trump) indicates a high numerical value, and correspondingly higher weight of member_of link 214.

In this manner, the relation 104 is referred to as "interested_in" personalization link 229, having a dark gray (user implicit) box in FIG. 2. The dark gray box corresponds with the user implicit engine 238, shown to the right, and discussed in more detail below. The "interested_in" link 229 enhances the connections and visualizations captured in the graph database 100. Specifically, the interested_in link 229 depicts a type of weighting represented by the numerical value of the relation 104 conveying "we noticed that you clicked on the article 102c," in response to the implicit behavior of the user 102a.

In addition to the "interested_in" link 229 (relation 104), a link 106 is established between the source 102b (USA Today) and the article 102c (Peace Talks with North Korea Planned). Thus, the developing personalization of the sample Slim-Spider website now has two relations: 104 and 106. Part of the process for completing the personalization includes the personalization engine performing textual analysis on all the articles it collects and that users may ultimately end up reading.

Tracking of the nodes and creation of the links is the heart of a first portion of the personalization process—initiated by the user's interaction (e.g., user explicit actions and implicit behaviors). The first portion occurs while the user is online and in near real-time and involves the use of several personalization engines. A second portion of the personalization process occurs afterwards, off-line. The second portion also includes the combined functionality of several personalization engines. More specifically, separately and independently, occurring after the user 102a has concluded their current Slim-Spider web session, several processes continue to run on the website off-line.

The off-line processes collect information covering a variety of different topics. In furtherance to the user 102a's explicit actions and implicit behaviors. These processes, triggered by the user's now concluded web session, attempts to understand the user's actions and behaviors that occurred during the web session, more deeply. These processes also seek to identify users similar to the user 102a and identify articles similar to articles the user 102a interacted with.

In FIG. 2, off-line processes occur on multiple levels and collect articles and other information on topics such as Trump, bit coins, sports, cars, etc. The collections occur using topline sources, and watches to define additional relationships. By use of the term topline sources, the personalization engines go to all topline news sources and attempt to capture every new available article on each topic. Watches represent criteria people establish to watch for a specific trend, such as politics, sports, or similar.

In addition to capturing each new article from the topline news sources, the sample Slim-Spider news website performs content queries on those topics or watches (i.e., criteria) the user has created. Accordingly, the news website will specifically seek "Trump" and "Lebron James" related information. In addition to new information that emerges on Trump and Lebron James, there is an ongoing historical backfill that occurs on those trends. An additional feature permits searches of older articles about Trump and Lebron James via a calendar control that enables searching for any terms, back to a specific year and day. The purpose of such a search would be to determine what articles appear, for those particular terms, the specific year and day specified.

In the example of FIG. 2, one of the personalization engines that conducts the separate and independent processes discussed above is compute engine 230 (e.g., light gray background). The compute engine 230 performs computations necessary to define relationships and links that are stored in the graph database 100 during the off-line processes above. In the illustrious embodiments, the compute engine 230 is the primary news gathering engine and one of the several personalization engines that combine functionality to provide content personalization. Every article a user will encounter is eventually analyzed, at some level, by the compute engine 230. That is, whenever a user queries or interacts with a new article, the compute engine 230 adds that article to the database 100. Subsequent to storage in the database 100, the links created by the compute engine 230 are only computed once and are not re-computed, or revised, by the compute engine 230.

In the example of news websites, such as the sample Slim-Spider, there are several types of off-line processes that are computed 24/7. Within the context of content personalization, the compute engine 230 essentially collects new articles related to the user's Slim-Spider web sessions and adds them to the graph database 100. When a new article is received, such as the article 102c (Peace Talks . . . ) the entity extraction feature, performed by the compute engine 230, determines that the Trump is a topic related to the article 102c (Peace Talks . . . ). An "is about" link 210d is calculated between the article 102c and politics category 102e. The strength of the "is about" link is also immediately calculated—on the spot, in near real-time. As noted earlier, these calculations determine relations between topics and articles and are only performed once, in the absence of human intervention.

An analytics engine 232 (e.g., zigzag pattern), also shown in FIG. 2, performs calculations that determine relations, or similarities, between users. The analytics engine 232 performs its calculations during certain times of the day, several times per day, or several times per week, etc. The analytics engine 232 analyzes all news articles collected by the compute engine 230, and that are sequentially stored in the graph database 100, to determine how the articles relate to each other. The analytics engine 232 analyzes the articles independently and within the context of the explicit actions and implicit behaviors of users interacting with the articles. For example, the analytics engine 232 may evaluate the explicit actions and implicit behavior of one user and compare those actions and behaviors with several other users and analyze other factors to determine similarities, the users.

An analytics cycle engine 234 (e.g., vertical line pattern) also computes, among other things, links representing user/user similarities and article/article similarities. These links are used for specific types of recommendations and are recomputed as frequently as possible. A fundamental assumption behind the analytics cycle engine 234 is that the user 102a (any user) would consider a recommendation from another user, similar to themselves, to be relevant. The greater the similarities between the other user to the user 102a, the greater the relevance the user will give the recommendation of the other user.

Specifically, in the exemplary embodiments, the analytics cycle engine 234 can perform computations throughout the day to analyze data relevant to similarities. For example, the analytics cycle engine 234 may analyze current interests of the user 102a, and user 406 and calculate, based on various factors, how similar those interests are. It may also adjust the numerical weight, assigned to the corresponding link, several times per day, weekly, monthly. The timeframe of these calculations is variable.

This capability eliminates the shortcomings associated with conventional approaches that are limited to evaluating similarities between users by applying, for example, "five-star" evaluation systems, "left-to-right" swipe systems, thumbs-up or thumbs down, and/or "likes." The conventional approaches provided very little real information (if any) about the users providing these explicit actions. The exemplary analytics cycle engine 234 provides a unique approach to analyzing both the explicit and implicit behaviors of users, and other factors to recalculate the strength of related links over time, and identify users that are objectively more similar, based on more relevant traits.

A user explicit engine 236 (e.g., horizontal pattern) permits instant action on user explicit actions. A user implicit engine 238 (dark gray solid color) permits instant actions on user implicit behaviors. For the user explicit actions and implicit behaviors, an on-demand function, connected to a content server, captures the user's immediate actions and adds those actions to the graph database 100. For example, the moment the user clicks on an article or opens a webpage in a personalization website, or answers a questionnaire, or likes an article, the user explicit engine 236 or the user implicit 238 engines respectively calculate a relational link and adds that calculated link to the graph database 100.

User explicit and implicit links (i.e. created by the explicit and implicit engines 236 and 238, respectively) are updated constantly. That is, as users continue clicking and interacting with various articles, those corresponding relations get stronger in near real-time. In FIG. 2, the more articles about peace talks (article 102c), or the more articles about Clinton (article 250) the user clicks on or interacts with, their corresponding relations will get stronger.

The administrative manual engine 240 (e.g., diagonal stripe pattern) provides the human intervention mentioned above; a human in the loop concept; a team of administrative people that might may be able to subtleties or nuances in an article. These nuances and subtleties may not be recognizable by a computer. The idea behind the human in the loop concept is that a human can perhaps over-ride, or tweak, a recommendation.

Referring back to the compute engine 230, one of the off-line processes it performs is referred to herein as entity extraction. During entity extraction, specific elements of the article are extracted, such as the names of individuals, locations, company names, etc. The purpose of the entity extraction is to understand, on a deeper level, the underlying purpose of a particular article. An additional off-line process performed by the compute engine 230 is textual analysis. As understood by those of skill in the art, textual analysis is a technique to analyze the content, structure, and functions of the messages contained in texts or visual images. The compute engine 230 performs a textual analysis on every article it collects as a result of articles the user 102a interacts with either explicitly or implicitly.

An additional off-line process performed by the compute engine 230 is referred to as sentiment analysis. Sentiment analysis is performed for all keywords extracted from articles identified during the off-line processes to understand whether the article's sentiment is positive or negative with respect to the keyword. For example, with Trump, this can be an article that is a pro-Trump, or it could be an anti-Trump article. From the standpoint of understanding what the user's interests are in the personalization model, it may be important to know whether the user is reading pro-Trump articles or anti-trump articles.

The entity extraction, textual analysis, and sentiment analysis, performed by the compute engine 230, builds light gray colored personalization links (relations) 210a-210e illustrated in FIG. 2, which match the background color of the compute engine 230 depicted in FIG. 2. Within the personalization links 210a-210e is the "is_about" feature, provided to establish that a particular article is about a given topic. For example, the "is_about" feature may establish that a particular article is about Trump, which is a keyword extracted from the article that aids recognition of what the article is about.

The "is_about" feature is desirably added to the graph database 100 to enhance the personalization accuracy of the database. The accuracy of the database 100 can be enhanced by recognizing by adding these underlying relations in a manner similar to the "interested in" feature above. Thus, a corresponding numerical value would similarly be assigned to each of the "is_about" links 210a-210e, with respect to a relation between the depicted articles (Peace Talks . . . , Clinton, and Jobs Report) and the respective topics (Sarah Huckabee Sanders, Hillary Clinton, and Trump). The numerical value, noted above, and assigned to each link, represents the level of confidence in the assessment that the article is actually about the topic.

For example, the link 210b indicates the article 102c (Peace Talks with North Korea Planned) "is_about" the topic of topic Trump 102f. In reality, the article could be several paragraphs about North Korea with one sentence about Trump. In this situation, the "is_about" link would represent a very weak relation and would have a correspondingly low numerical value. If it mentions Trump a significant number of times and provides more information about the topic, the link would be stronger, and its numerical value would correspondingly be higher.

In addition to the entity extraction, textual analysis, and sentiment analysis that occurs off-line, a team of personalization administrators (live people) are available in the loop and can manually assist the process, provided by the administrative manual engine 240. However, this "human in the loop," or manual assist, feature is optional. As shown in FIG. 2, each of the light gray colored links 210a-210e also includes a small diagonal stripe pattern portion. As one example, the link 210a includes a light gray portion 216 corresponding to the compute engine 230. The link 210a, however, also includes a diagonal stripe pattern portion 218 corresponding to the admin manual engine 240. The pattern portion 218 is better described below, in the description of FIG. 3.

Figure 3:
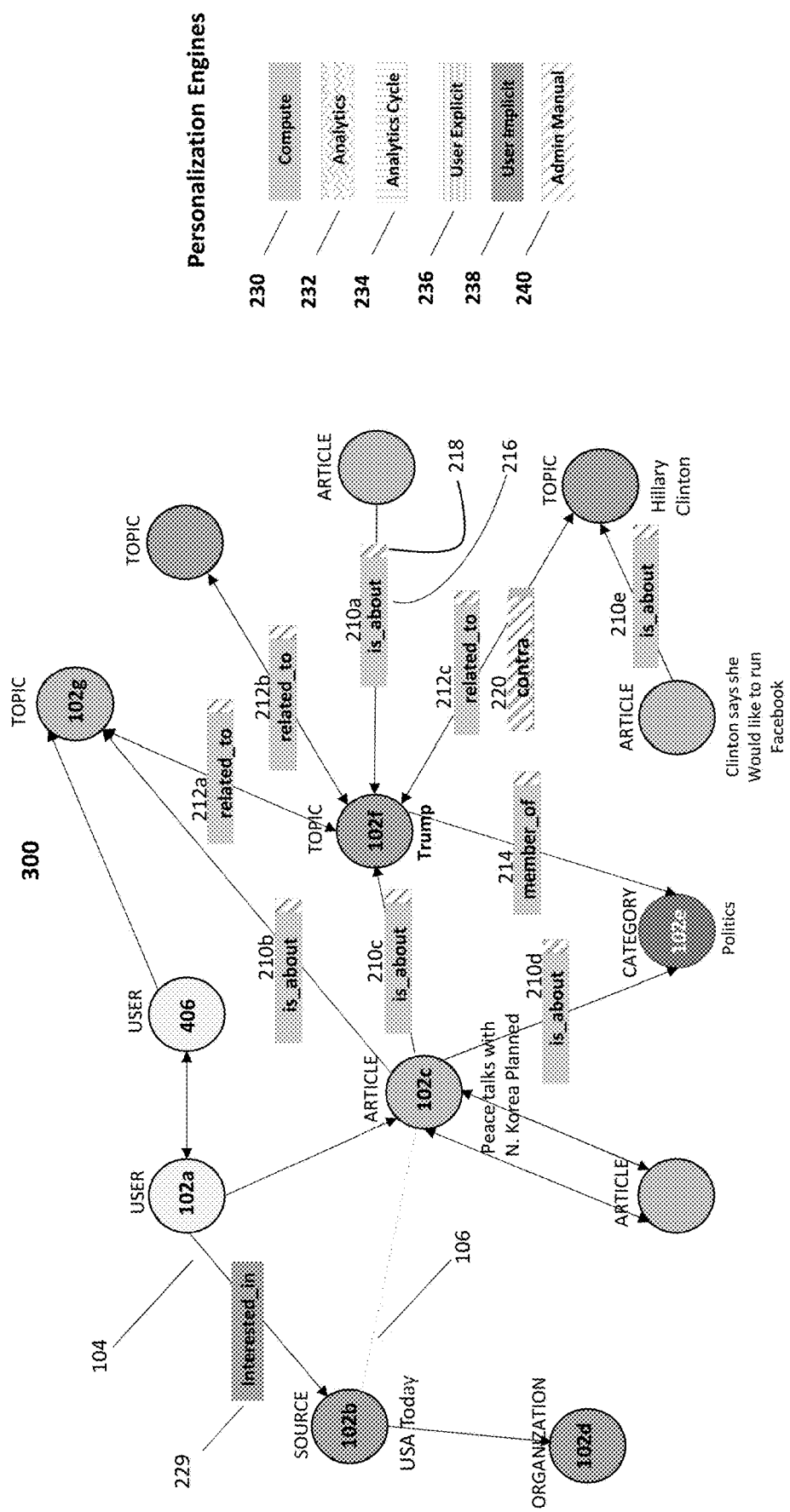
FIG. 3 illustrates a more detailed view of the content personalization model graph database of FIG. 2 in accordance with the embodiments.

FIG. 3 is a more detailed view 300 of the graph database 200 depicted in FIG. 2. The compute engine 230, also depicted in FIG. 3, at least in-part, creates "related_to" links 212a-212c, "member_of" link 214, and contra link 220. The "related_to" links 212a-212c establish whether, and to what extent, one topic might relate to another topic. The member_of link 214 determines if, and to what extent, the Trump topic 102f falls within the politics category 102e.

The is_about link 210a includes the larger light gray solid colored portion 216 and the much smaller patterned (diagonally striped) portion 218. This, combined color/pattern arrangement, in the example of the is about link 210a, indicates that most of the link 210a, about 85%, was determined by the compute engine 230. However, about 15% of the link 210a is calculated by the administrative manual personalization engine 240.

That is, after the first portion of the calculations are completed by the compute engine 230, a human, using another interface via the admin manual personalization engine 240, adjusts, tweaks, and/or strengthens the underlying relationship 210a. These manual adjustments may be desirable because of the possibility that certain types of relations can sometimes be hard to determine and/or the algorithms calculating the link can be prone to error. Additionally, the user may desire results that are distinctly different from recommendations and preferences based on the user's profile. Specifically, the user may desire contra-Personalization™.

The contra_link 220 includes a mix of calculations from the compute engine 230 and the admin manual processing 240 engine, and provides contra personalization. The contra_link 220 is independent of related_to links (e.g., the link 212c). While contra relationships are created automatically, as depicted in the example of the contra_link 220, contra links also permit manual adjustments. These manual adjustments will also generate contra-personalized recommendations. Thus, automatic and manually adjusted contra recommendations are both possible and part of the embodiments.

Contra-personalization includes recommending articles, for example, that are outside the sphere of articles the user would predictably prefer and repeatedly read. Contra-personalization enables the user to escape their so-called echo chamber by providing a type of filtering where the user receives articles from a different perspective or a different point of view. Since contra-personalization is calculated primarily by the administrative manual engine 240, humans can tweak or manually adjust the weights between the links to enhance their reliability.

As an example, in most cases it's probably easy to automatically compute that Trump and Hillary Clinton are opposing topics. In some cases, however, it may be difficult to determine this fact. In this case, an administrative team may be able to review the data and construct the link 220, or tweak initial calculations, or numerical values assigned to the links, more effectively than an algorithm. That is, a human may be more effective in situations that require recognition of subtleties or require and exercise of judgment.

Thus, the "is_about" links 210a-210e, "related_to" links 212a-212c, "member_of" link 214, and "contra" link 220, that include both the solid color and diagonal stripe pattern background provide a type of multi-factored processing, and an integration of man-machine cooperation. The processing is performed by the admin manual engine 240, and the compute engine 230 and create a single link between two nodes. In other situations, involving links related to users, the embodiments can use separate processing engines to create multiple completely independent links (of the same type) between two nodes, as illustrated in FIG. 4.

Figure 4:
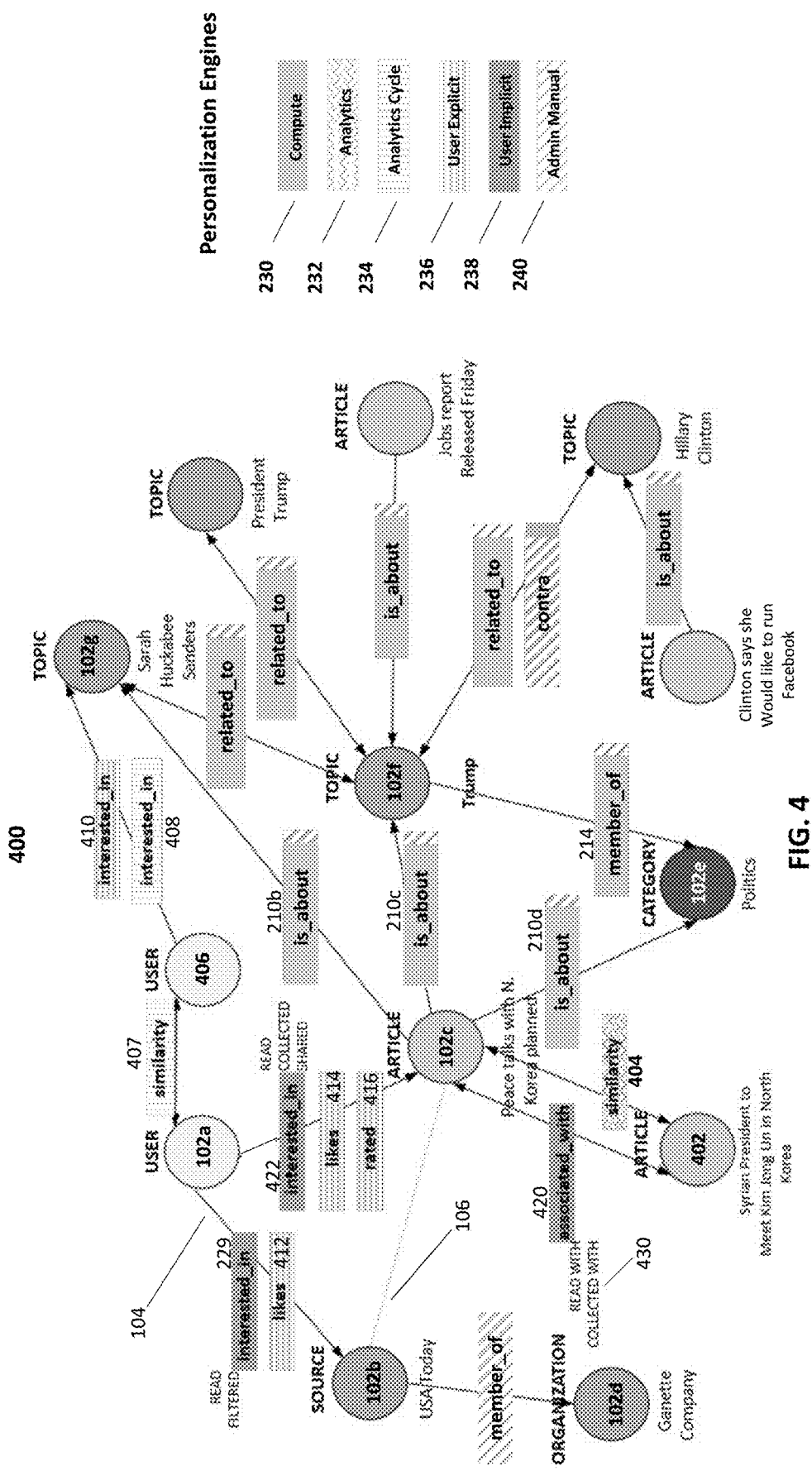
FIG. 4 illustrates a further detailed view of the content personalization model graph database of FIG. 3.

FIG. 4 illustrates an even more detailed view (personalization model) 400 of the graph database view 300 in FIG. 3, in accordance with the embodiments. In FIG. 4, consider user node 406 and topic node 102g. These two nodes are connected by completely independent "interested_in" links 408 and 410. That is, the "interested_in" link 408 was calculated by the analytics cycle engine 234 while the "interested_in" link 410 was calculated independently by the user explicit engine 236. In other words, "interested_in" is both explicit and recomputed regularly by watching actual behavior.

The purpose of this type of multi-level processing is because embodiments of the invention, such as the sample Slim-Spider system discussed above, attempt to separate what a user says they are interested in from their actual behavior. Exemplary systems in accordance with the embodiments, such as the personalization model 400, also attempt to capture decay in a user's interest in a topic, or evolution in the user's behavior.

As an example, five weeks ago and prior to a presidential election, user 406 indicated a very strong interest in the topic 102g "Sarah Huckabee Sanders" (i.e., presidential candidate Donald Trump by extension) by several explicit actions during a single Slim-Spider web session. For example, the user 406 gave a thumbs-up, and liked several articles highly favorable to the topic 102g and indicated a 5-stars on other articles. The moment the user 406 took each of these explicit actions, each action was stored (i.e., instantly) in the graph database 100. Correspondingly, the "interested_in" link 410 was created and a numerical weighting value (assessing the strength of the interest level of the user 406) was assigned. A more in-depth discussion about instant type personalization actions is necessary before continuing the discussion of multi-level processing.

FIG. 5 is a table 500 of example personalization types mapped with the personalization engines depicted in FIG. 4. For purposes of discussion herein, a vertical column in the table 500 contrasts several personalization types 502 with a horizontal column 504 including personalization engines. By way of example, the user explicit engine 236 and the user implicit engine 238 perform instant personalization. The compute engine 230, analytics engine 232, analytics cycle engine 234, and the admin manual engine 240 all perform the intra-session and extra-session personalization, as illustrated in FIG. 5.

Instant personalization includes actions that can immediately be calculated and/or tweaked, from one click to the next, and can be changed instantly, in real-time or near real-time. When a user opens a webpage and a clickable image appears, the moment the user clicks the image, the server (not shown) processes that action immediately and stores its corresponding data in the graph database 100.

For example, when the user posts a thumbs up on Facebook or Netflix, or response to an online questionnaire on Yelp, or some other page, those user actions are recorded immediately, and the underlying personalization model graph database (e.g., the graph database 100) is updated. The very next image the user sees is an updated image because the corresponding link in the database was updated instantly. Intra-session and extra-session user actions do not occur instantly or in near real-time.

A significant challenge in performing real-time personalization is reducing the amount of computing required when a user clicks on an image or opens a new webpage. The desire, as with instant personalization discussed above, is that when the user clicks on the image or opens the new webpage, that the very next thing they see should be different—that the responses to their actions be instantaneous. In reality, because some of the resulting calculations can be computationally expensive, for example, comparing one user to other users, or one topic to other topics, these operations and calculations can be time intensive and expensive.

In particular, some calculations can literally require several minutes before an answer can be calculated or recalculated in response to a user action during a web session. It's undesirable to have the user waiting several minutes between clicks, during an active web session, for a new web page to open. Therefore, during intra-session personalization, some processes are designed for "off-line" operation.

For example, the entity extraction, textual analysis, and sentiment analysis performed by the compute engine 230, are designed for "off-line" execution to facilitate application of additional processing power. These processes can be segmented, or sub-divided, into a number of smaller processes that can all desirably be completed before the user finishes their current web session or exits an application. That is, before the user clicks away to a new website, the personalization engines will have created and provided the user with one or more new recommendations.

Extra-session personalization, as used herein, refers to calculations performed between a user's last web session (e.g., last month, last week, or yesterday) and their current web session (e.g., today). That is, between their last web session and the next time the user logs on, additional calculations have been performed by the personalization engines and one or more new recommendations are ready to be provided. These tasks can be the most computationally expensive.

For example, when determining similarities between the user and other users, the personalization engines may have analyzed the user explicit actions and user implicit behaviors of millions of other users that interacted with the same links as the user of interest, since that user's last visit, one month ago. Analyzing such a large number of behaviors and actions would require an analysis of many different factors in a variety of categories. As such, the computational and time requirements to complete the analysis could potentially be enormous.

User to user similarities are significant, because users may consider recommendations from users, similar to themselves, particularly relevant and weighty. That is, users may think they are similar to another user, based on one or two clicks during a web session. However, those one or two clicks do not reveal any real information about the additional users. This lack of information can limit the relevance of any recommendations the user or users may provide.

By way of example, in the exemplary embodiment depicted in FIG. 4, similarities between the user 102a and the user 406 can be created via the analytics cycle engine 234 with a relatively high strength and weight using extra-session personalization. During a current web session, the user explicit engine 236 and the user implicit engine 238 instantly capture all the interactions the user 102a had with the articles and other information, and immediately store that information in the graph database 100.

After the user 102a logs out of the web browsing session, the analytics cycle engine 234 performs similar functions (storing user explicit actions and user implicit behaviors) related to additional users, perhaps millions of additional users, and up to thousands or millions of other data points. This analysis is performed until the user 102a logs onto the website (e.g., Slim-Spider) for the next, or ensuing, web session, perhaps several weeks later.

During this ensuing web session, the analytics cycle engine 234 creates a similarity link 407 (e.g., vertical pattern) between the user 102a and the user 406, and immediately assigns a weighting value. After the similarity link 407 is established, any recommendations provided to the user 102a from the user 406 may carry more relevance than recommendations from other nodes or entities. Accordingly, any topics the user 406 might be interested in, such as the topic 102g, may also be relevant to the user 102a.

The multi-level processing example, discussed earlier, is particularly helpful in creating links connecting users to nodes or other entities. Returning now to the example above. In that example, the user 406 had a strong interest in the topic 102g Sarah Huckabee Sanders (i.e., presidential candidate Donald Trump) five weeks ago. Four weeks ago, however, presidential candidate Donald Trump lost the election. As a result, the user 406 has not clicked a thumbs up, given a positive swipe, or provided a 5-star rating to any article about the topic 102g within the last four weeks. Nor have there been any other additional user explicit actions or implicit behaviors exhibited by the user 406 related to the topic 102g in the last four weeks.

Although the user 406 said things and did things four weeks ago, indicating a strong interest in the topic 102g, that strong interest is no longer valid. Additionally, the user explicit "interested_in" link 410 cannot capture sudden lack of interest the user 406 is now expressing toward the topic 102g, as the user's interest decays or evolves.

The analytics cycle engine 234 can capture this evolution in the interests and behavior of the user 406. The analytics cycle engine 234 can collect more data over several days. Since the user 406 is no longer interacting with articles relevant to Donald Trump, the topic 102g is no longer as relevant in terms of recommendations. Accordingly, over time, the weight of the link 408 between the user 406 and the topic 102g, will also decay. That is, as the user 406 ceases to interact with articles over time, the analytics cycle engine 234 will detect this diminished level of activity and will adjust the strength of the corresponding link. The analytics cycle engine 234 performs these calculations only, once in relation to the link 408 between the user 406 and the topic 102g, unless the link 408 is tweaked by the user admin engine 240.

In the exemplary embodiment depicted in FIG. 4, just as the analytics cycle engine 234 performs calculations to create the similarity link 407 (relating a user to a topic), the analytics engine 232 (zigzag pattern) may perform calculations to create a slightly different type of similarity link 404 (relating an article to an article). For example, in FIG. 4 an article 402 is entitled "Syrian President to Meet Kim Jong Un in North Korea". For purposes of illustration, assume the compute engine 230 collected the article 402, as a new article, one month ago. However, the article 102c (Peace Talks with North Korea Planned) was collected five minutes ago. In this example, there is a separate analytics process performed by the analytics engine 232, that attempts to relate all new articles to past articles previously stored in the database 100.

The separate analytics function, mentioned above, is primarily performed by the analytics engine 232, which relates and finds relations between new articles based on how similar they are in their content, etc. As the analytics engine 232 begins finding articles using techniques described above understood by those of skill in the art, it begins recommending articles to the user. Once the similarity link 404 is calculated, the analytics engine 232 never attempts to recompute the similarities between those articles. There may be revisions to the articles that people post to the website, based on the recommendations. However, in this situation, that revised article will appear as new, as computed by the compute engine 230. An additional feature depicted in FIG. 4, referred to herein as "read-with" 430 can be used to kickstart calculations of the similarity link 404, along with a straight comparison of topic overlap.

Figure 6:
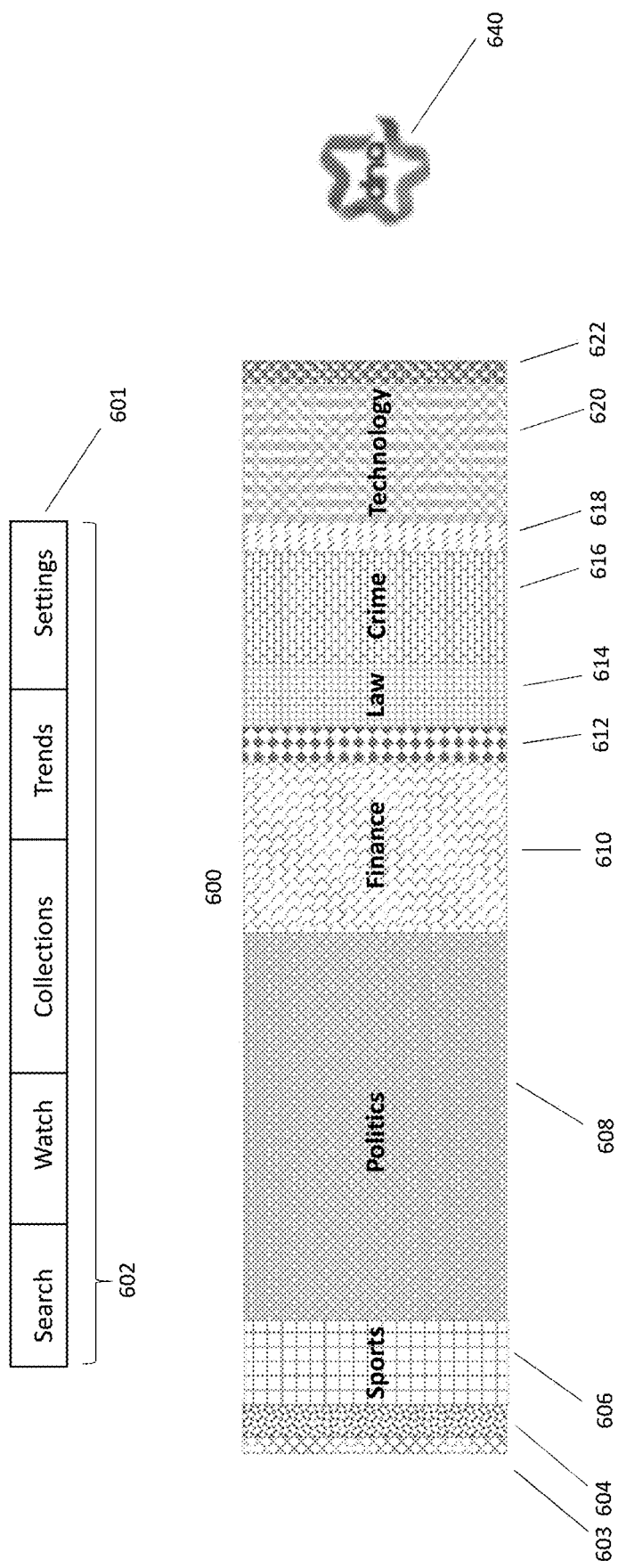
FIG. 6 depicts an example profile of interest DNA (PIDNA) user interface tool constructed in accordance with the embodiments.

FIG. 6 depicts an example profile of interest DNA (PIDNA) user interface, for example, graphical user interface (GUI) tool 600, constructed in accordance with the embodiments. The PIDNA bar 600 provides the user with a graphical summary of news categories or information categories corresponding to the user's personalization interests. An adjustments bar 601 enables the user to personalize the data represented in the PIDNA bar 600 in the various categories 602. Although the adjustments bar 601 is depicted as being associated with the PIDNA bar 600, its portability can be extended to the broader personalization model 400.

In FIG. 6, the PIDNA bar 600 is constructed in the form of slivers 602-622, each representing news categories, or information categories corresponding to the user's personalization preferences. The PIDNA bar 600 provides the user with a visualization of the user's interests relative to the width of the slivers 602-622. Increasing or decreasing the width of one of the slivers 602-622 changes the relative interest in that category which may translate into more or fewer articles in the category of the personalization model 400. Also, if the user reads fewer articles in each category, the corresponding sliver will automatically narrow. If the user reads more of a particular category, the corresponding sliver will widen.

For example, the PIDNA bar 600 indicates that the user has significant interests in politics 608, technology 620, crime 616, sports 606, etc. Further, tapping directly on a sliver, such as the politics sliver 608, enables the sliver to become an interface to perform a category keyword search. Panning over a sliver may increase the width of the sliver and reveal additional subcategories and controls. This interface feature, via the PIDNA bar 600, makes the underlying content personalization model particularly suitable for mobile platforms. In another example, a PIDNA similarity calculation can be performed by the analytics cycle engine 234, comparing similarities between content of the PIDNA bar 600 of one user (e.g., 102a) to content of the PIDNA bar 600 of another user (e.g., 406) as a further step to establish objective similarities. Arbitrary cluster membership is not represented here.

The controls may be used to change how the visualization itself (e.g., from a bar to a pie chart) with a person's image in the center—with the relative size of the pie wedges based on the relative interest value as a percentage. Still other controls may reveal the settings and information collected from a given website—so a person can see what is being collected and or personalized. Additional controls may reveal contra-personalization, discussed above, which provides the user with recommendations that are different or opposite from the user's typical sentiments, or interests as a way of avoiding the echo chamber affect or filter bubbles. A control 640 (e.g., icon, button, physical switch, etc.) gives the user an ability to instantly activate or deactivate the website's personalization functionality.

FIG. 7 illustrates an example summary of a user's personalization profile 700, created based on the personalization model 400 illustrated of FIG. 4. The personalization profile summary 700 includes profile entities 702-712 that roughly correspond to the nodes (102b, 102c, 102d, 102e, etc.), illustrated in FIGS. 1-4. That is, the personalization profile summary 700 represents a quick look at the actual entities (i.e., locations 702, organizations 704, people 706, titles 708, sources 712, etc.) that are extracted by the compute engine 230 from articles the user clicks or interacts with or may be directly utilizing. These clicks or interactions occur through the user's explicit actions or implicit behaviors.

In FIG. 7, the lighter and darker shades represent level, frequency, or intensity of the user's interaction: the lighter shades representing less and darker shades representing more activity. A solid versus pattern background represents the user's positive or negative sentiment about the article. A completely white background represents neutrality. For example, in the personalization profile summary 700, the user's explicit actions and implicit behaviors demonstrated a slight interest, with positive sentiment (i.e., slightly liked) in South Africa 714 as well as a very strong interest with positive sentiment (i.e., strongly liked) in Jay-Z 716.

The user demonstrated complete neutrality about the source blogs.wsj.com 720. However, the user strongly liked usatoday.com 722, but strongly disliked video.foxnews.com 718. Given all users' unique preferences (i.e., interests, likes, dislikes, etc.) for various entities (702-712), embodiments of the present invention give the user a unique tool that provides personalization fine tuning. The embodiments also provide a method for users to view and consider the specific factors used in the personalization engines.

FIG. 8. illustrates a sample use case of an example interface (e.g., GUI) tool 800 that allows a user to fine tune their personalization profile 700, shown in FIG. 7. The interface tool 800 allows the user to focus on any of the specific entities identified in the user's profile summary 700 and fine grain tune, or drive the weighting and connections for the specific entity The user can control whether to see more of, or less of, the entity in future updates of the user's personalization. The interface tool 800 includes a tuning control 802 (e.g., a slider, a button, a dial etc.) allowing the user to adjust their entity interest level within a range from disinterested 806 to interested 808.

The interface tool 800 provides the user the ability to fine tune how much, or how little, of a specific entity appears in their personalization profile 700 and their personalization model 400. By moving the slider left or right, the user literally adjusts the numerical value (weighting) assigned to corresponding interested_in links, such as the link 410 associated with the user 406, or the links 229 and 422 associated with the user 102a. In other words, moving the slider 802 instantly affects the personalization model, especially for links culminating from the user's explicit actions and implicit behaviors.

In example of FIG. 8, the user has chosen to focus on the specific source entity usatoday.com 722, identified in their profile summary 700 of FIG. 7. If the user moves the slider 802 all the way to the left (disinterested 806), the weighting numerical value of the associated links is decreased. As a result, the usa.com. source 722 will not appear in future updates to the user's future personalization models. By moving the slider all the way to the right (interested 808), the weighting numerical values are increased. Correspondingly, the usa.com source 722 will appear with increased frequency as the user clicks on those topics in the future.

FIG. 9 illustrates another sample use case 900 of the slider interface tool 800 depicted in FIG. 8. In FIG. 9, for example, the user decided to stop seeing all articles from the video-.foxnews.com source 718. Accordingly, the user moved the slider 802 all the way to the left, adjusting the weighting numerical value of the associated link. As a consequence, the user will no longer receive recommendations of articles from the source. Unless the user's implicit behavior alters the profile over time, indicating the user's preferences have changed with an interest in that source, the personalization is dynamic and organic. The adjustment tool 800 provides the user with a unique personalization, customization feature: the ability to carefully fine tune their personalization profile not only type or kind, but also by degree or intensity of like or interest.

FIG. 10 is a flow chart of an exemplary method 1000 of practicing an embodiment of the present invention. In FIG. 10, the exemplary method 1000 provides personalization of a website's news content to a user beginning with block 1002, receiving data (i) representative of the user's interaction with the existing content and (ii) indicative of content entities of interest to the user. Block 1004 includes storing the received data indicative of the content entities of interest as nodes in a graph database, and then analyzing, via one or more processors, relations between one or more pairs of the nodes, in block 1006. Each relation is associated with a link and a structure of each of the links is a function of the user's interaction with the existing content. In a block 1008, personalizing the website's new content occurs, via the processors, for a corresponding one of the links when a type of the link is within a first category.

FIG. 11 illustrates one example of a non-generic computer 1100 configured for implementing the embodiments of the personalization model 400 depicted in FIG. 4. FIG. 11 depicts a system 1100 that includes an application-specific processor 1114 configured to perform tasks specific to providing tools that enable content customization and personalization. The processor 1114 has a specific structure imparted by instructions stored in a memory 1102 and/or by instructions 1118 that can be fetched by the processor 1114 from a storage 1120. Storage 1120 may be co-located with the processor 1114 or may be located elsewhere and be communicatively coupled to the processor 1114 via a communication an interface 1116, for example. The entity and relation information associated with the nodes and links, and illustrated in FIGS. 1-4, are stored in the graph database 1122 and provide unique and novel end user benefits, discussed herein.

The system 1100 can be a stand-alone programmable system, or it can be a programmable module located in a much larger system. For example, the system 1100 can be part of a server. The processor 1114 may include one or more hardware and/or software components configured to fetch, decode, execute, store, analyze, distribute, evaluate, and/or categorize information.

Furthermore, the processor 1114 can include an input/output module (I/O module 1112) that can be configured to ingest data pertaining to single assets or fleets of assets. The processor 1114 may include one or more processing devices or cores (not shown). In some embodiments, the processor 1114 may be a plurality of processors, each having either one or more cores. The processor 1114 can be configured to execute instructions fetched from the memory 1102, i.e. from one of memory block 1104, memory block 1106, memory block 1108, and memory block 1110.

Furthermore, the storage 1120, the graph database 1122, and/or the memory 1102 may include a volatile or non-volatile, magnetic, semiconductor, tape, optical, removable, non-removable, read-only, random-access, or any type of non-transitory computer-readable computer medium. The storage 1120 may be configured to log data processed, recorded, or collected during the operation of the processor 1114. The data may be time-stamped, location-stamped, cataloged, indexed, or organized in a variety of ways consistent with data storage practice. The storage 1120, the graph database 1122, and/or the memory 1102 may include programs and/or other information that may be used by the processor 1114 to perform tasks consistent with those described herein.

For example, the processor 1114 may be configured by instructions from the memory block 1104, the memory block 1106, the memory block 1108, the memory block 1110, and the memory block 1111 to perform operations related to the compute engine 230, the analytics engine 232, the analytics cycle engine 234, the user explicit engine 236, and the user implicit engine 238, respectively. The processor 1114 may execute the aforementioned instructions from the memory blocks, 1104, 1106, 1108, 1110, and 1111 and output a data stream 1136 via the I/O module 1112 by way of an output 1124, such as the Internet.

By way of example, the instructions stored in the memory blocks 1104, 1106, 1108, 1110, and 1111—configured to perform the operations of the personalization engines 230, 232, 234, 236, and 238 respectively, are among the features that contribute to the specific, non-generic, functionality of the computer 1100. Additionally, the graph database 1122 is configured for storage of the specific graph structures associated with the nodes and relations that form the personalization model 400, discussed above and illustrated in the drawings.

Those skilled in the relevant art(s) will appreciate that various adaptations and modifications of the embodiments described above can be configured without departing from the scope and spirit of the disclosure. Therefore, it is to be understood that, within the scope of the appended claims, the teachings featured herein may be practiced other than as specifically described herein.

What is claimed is:

1. A computing device comprising:
at least one processor:
memory storing computer-readable instructions that, when executed by the at least one processor, cause the computing device to:
update a graph database for storage of data (i) representative of a user's interaction with existing content presented on a website and (ii) indicative of content entities of interest and disinterest to the user, the data being stored as nodes;
create a plurality of personalization engines, each of which uses machine learning analytics to analyze a plurality of relations between a first node and a second node, each analyzed relation creating a respective link, and a structure of the respective link being a function of the user's interaction with the existing content, wherein each respective link contains a plurality of personalization links relating the first node to the second node and wherein each of the plurality of personalization links are associated with one or more of the plurality of personalization engines;
wherein the plurality of personalization engines personalize new content for presentation to the user, and wherein a first personalization engine captures instant explicit interactions and implicit behaviors and a second personalization engine captures provides intra-session and extra-session personalization user actions; and wherein a portion of the new content is (i) derived from the respective link and (ii) delivered to the user online and in real time when a type of the respective link is within a first category wherein when the type of the link is within a second category, the personalizing of the website's new content to the user occurs off-line;

wherein the structure includes a numerical value corresponding to a relative weight of the of the user's level of interest in the respective link; and when the user ceases to interact with content over time, one of the plurality of personalization engines will detect a diminished level of activity and will adjust the relative weight of the user's level of interest in the respective link.

2. The computing device of claim 1, further comprising a graphical user interface for displaying to the user a summary of a user's content personalization profile;

wherein the graphical user interface includes a controller for permitting the user to tune the user's content personalization profile associated with the respective link; and wherein the user can adjust the relative weight associated with the respective link, via a slider, to change an amount of information presented about the respective link in the user's content personalization profile.

3. The computing device of claim 1, wherein the content entities of interest include one or more from a group including a user, an organization, an article, a category, and a topic.

4. The computing device of claim 3, wherein the personalization occurs immediately.

5. The computing device of claim 1, wherein the first category includes at least one of user explicit actions and user implicit behavior.

6. A computer implemented method for providing personalization of a website's new content to a user interacting with the website's existing content, comprising:

receiving data (i) representative of the user's interaction with the existing content presented on the website and (ii) indicative of content entities of interest to the user;

storing the received data indicative of the content entities of interest and disinterest as nodes in a graph database;

analyzing, via a plurality of personalization engines, each of which uses machine learning analytics, a plurality of relations between a first node and a second node;

wherein each analyzed relation creates a respective link, a structure of the respective link being a function of the user's interaction with the existing content, wherein each respective link contains a plurality of personalization links relating the first node to the second node and wherein each of the plurality of personalization links are associated with one or more of the plurality of personalization engines; and personalizing, via the processors, the website's new content for presentation to the user, wherein a first personalization engine captures instant explicit and implicit interactions and implicit behaviors and a second personalization engine captures provides intra-session and extra-session personalization user actions;

wherein a portion of the new content is (i) derived from the respective link and (ii) delivered to the user online and in real time when a type of the respective link is within a first category wherein when the type of the link is within a second category, the personalizing of the website's new content to the user occurs off-line;

wherein the structure includes a numerical value corresponding to a relative weight of the of the user's level of interest in the respective link; and when the user ceases to interact with content over time, one of the plurality of personalization engines will detect a diminished level of activity and will adjust the relative weight of the user's level of interest in the respective link.

7. The computer implemented method of claim 6, wherein the website is a dynamic news delivery website.

8. The computer implemented method of claim 6, wherein the first category includes at least one of the user's explicit actions and the user's implicit behaviors.

9. The computer implemented method of claim 6, wherein the personalization occurs immediately.

10. The computer implemented method of claim 9, wherein when the type of the link is within a second category, the personalizing of the website's new content to the user occurs off-line.

11. The computer implemented method of claim 6, wherein the content entities of interest include one or more from a group including a user, an organization, an article, a category, and a topic.

12. The computer implemented method of claim 6, wherein the one or more processors include at least one from a group including user explicit and user implicit personalization engines.

13. A non-transitory computer-readable medium having stored thereon, computer executable instructions that, if executed by a computing device, cause the computing device to perform a method for providing personalization of a website's new content to a user interacting with the website's existing content, comprising:

receiving data (i) representative of the user's interaction with the existing content presented on the website and (ii) indicative of content entities of interest to the user;

storing the received data indicative of the content entities of interest as nodes in a graph database;

analyzing, via a plurality of personalization engines, each of which uses machine learning analytics, a plurality of relations between a first node and a second node;

wherein each analyzed relation creates a respective link, a structure of the respective link being a function of the user's interaction with the existing content, wherein each respective link contains a plurality of personalization links relating the first node to the second node and wherein each of the plurality of personalization links are associated with one or more of the plurality of personalization engines; and personalizing, via the processors, the website's new content for presentation to the user, wherein a first personalization engine captures instant explicit interactions and implicit behaviors and a second personalization engine provides intra-session and extra-session personalization;

wherein a portion of the new content is (i) derived from the respective link and (ii) delivered to the user online and in real time when a type of the respective link is within a first category;

wherein when the type of the link is within a second category, the personalizing of the website's new content to the user occurs off-line;

wherein the structure includes a numerical value corresponding to a relative weight of the of the user's level of interest in the respective link; and when the user ceases to interact with content over time, one of the plurality of personalization engines will detect a diminished level of activity and will adjust the relative weight of the user's level of interest in the respective link.

14. The non-transitory computer-readable medium of claim 13, wherein the personalization occurs within a current website browsing session.

15. The non-transitory computer-readable medium of claim 13, wherein the personalization occurs immediately.

16. The non-transitory computer-readable medium of claim 13, wherein the second category includes at least one from a group including related-to, is-about, member-of, and contra type links.

* * * * *